(12) United States Patent  (10) Patent No.: US 6,318,784 B2
Nishide  (45) Date of Patent: Nov. 20, 2001

(54) AUTOMOTIVE SEAT (75) Inventor: Harutomi Nishide, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/726,565

(22) Filed: Dec. 1, 2000

(30) Foreign Application Priority Data

Dec. 1, 1999 (JP) .................................................. 11-341971

(51) Int. Cl.$^7$ .................................................. B60N 2/02
(52) U.S. Cl. .................................. 296/65.09; 296/97.23; 296/66; 296/69; 297/15
(58) Field of Search .................. 296/65.09, 97.23, 296/66, 69; 297/15

(56) References Cited

U.S. PATENT DOCUMENTS

| | | | |
|---|---|---|---|
| 4,519,646 | * 5/1985 | Leitermann et al. | 297/15 |
| 4,779,917 | * 10/1988 | Campbell et al. | 296/65.1 |
| 4,877,282 | * 10/1989 | Yamauchi | 296/65.1 |
| 5,269,581 | * 12/1993 | Odagaki et al. | 296/65.1 |
| 5,482,346 | * 1/1996 | Lesourd | 296/66 |
| 5,868,451 | * 2/1999 | Uno et al. | 296/66 |
| 6,196,613 | * 3/2001 | Arai | 296/65.13 |
| 6,231,101 | * 5/2001 | Kamida et al. | 296/65.03 |

FOREIGN PATENT DOCUMENTS

| | | |
|---|---|---|
| 2 776 588 | * 3/1998 | (FR) . |
| 62-194948 | * 8/1987 | (JP) . |
| 11-198697-A | 7/1999 | (JP) . |

OTHER PUBLICATIONS

German Office Action with English Translation, dated Jan. 30, 2001 , serial # 10059335.6–16.

* cited by examiner

*Primary Examiner*—Joseph D. Pape
*Assistant Examiner*—Kiran B. Patel
(74) *Attorney, Agent, or Firm*—Arent Fox Kintner Plotkin & Kahn, PLLC (57) ABSTRACT

A lid 24 is constituted by an extending portion 41 of a first carpet 35 extending from the front of a lower portion of a seat cushion 21, a second carpet 43 integrally mounted on the extending portion 41 via a base material 42, and the first carpet 35 is made to function as a hinge 45. In addition, the lid 24 is constructed so as to be retained to a floor 15 with a surface fastener 44.

8 Claims, 9 Drawing Sheets

AUTOMOTIVE SEAT

BACKGROUND OF THE INVENTION

1. Field of the Invention

The present invention relates to the improvement of an automotive seat in which a seat back and a seat cushion are accommodated in a depressed portion provided in a floor of an automotive vehicle.

2. Description of the Related Art

FIGS. 8A to 8D are diagrams explaining a first operation of a conventional automotive seat.

Figure 8A:
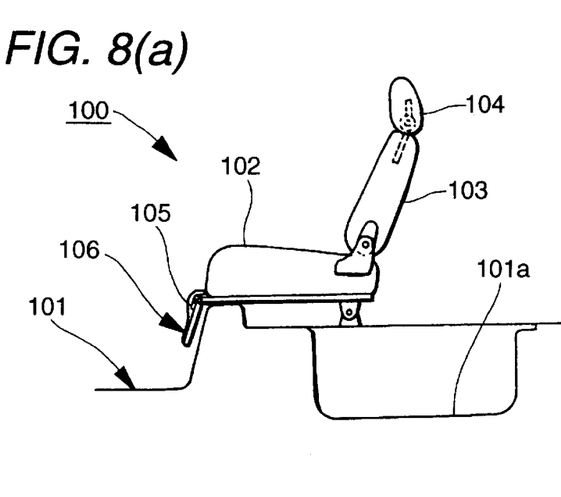
FIGS. 8A to 8D are diagrams explaining a first operation of a conventional automotive seat.

In FIG. 8A, a conventional auto motive seat 100 is constructed such that a seat cushion 102 is rotatably mounted on a floor 101 of an automotive vehicle at a lower end of a rear portion thereof, that a seat back 103 is rotatably mounted on the seat cushion 102 at a lower end thereof, that a head restrain 104 is mounted on an upper end of the seat back 103 slidably and rotatably, and that a lid body 106 is mounted to a lower end of a front portion of the seat cushion 102 via hinge 105.

Figure 8B:
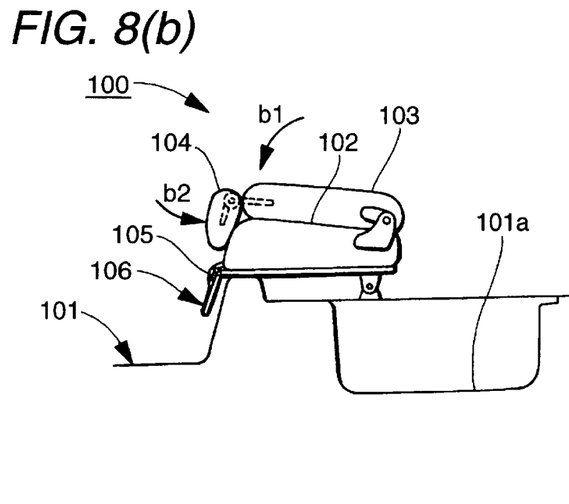

In FIG. 8B, the seat back 103 is folded over the seat cushion 102 as indicated by an arrow b1, and the head restraint 104 is caused to rotate toward a seat cushion side as indicated by an arrow b2 so that the head restraint 104 is folded over the seat cushion 102.

Figure 8C:
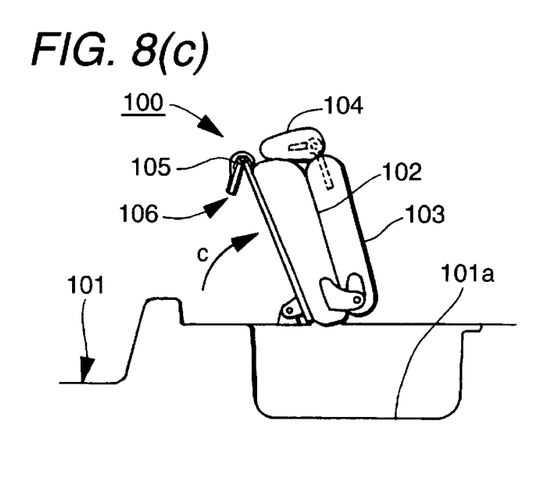

In FIG. 8C, an integral body of the seat cushion 102, the seat back 103 and the head restraint 104 formed by folding the seat back and the head restraint over the seat cushion is then caused to rotate toward the rear of the vehicle as indicated by an arrow c.

Figure 8D:
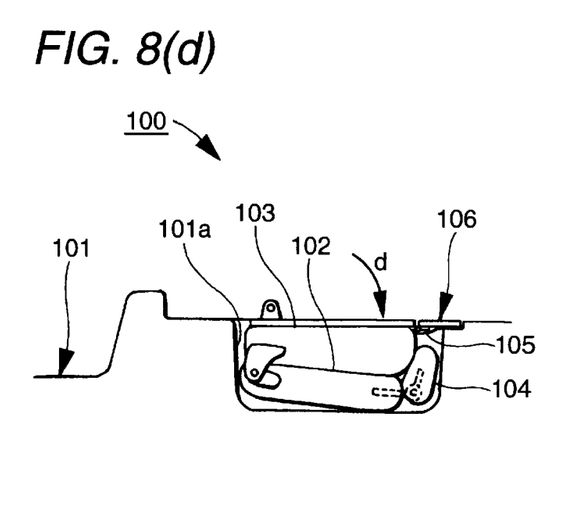

In FIG. 8D, the integral body of the seat cushion 102, the seat back 103 and the head restraint 104 is accommodated in a depressed portion 101a provided in the floor 101 of the vehicle as indicated by an arrow d, and a space left in the depressed portion 101a is closed with the lid body 106.

Namely, the automotive seat 100 is a seat constructed such that the seat cushion 102 and the seat back 103 are accommodated in the depressed portion 101a formed in the floor 101 of the vehicle.

Figure 9:
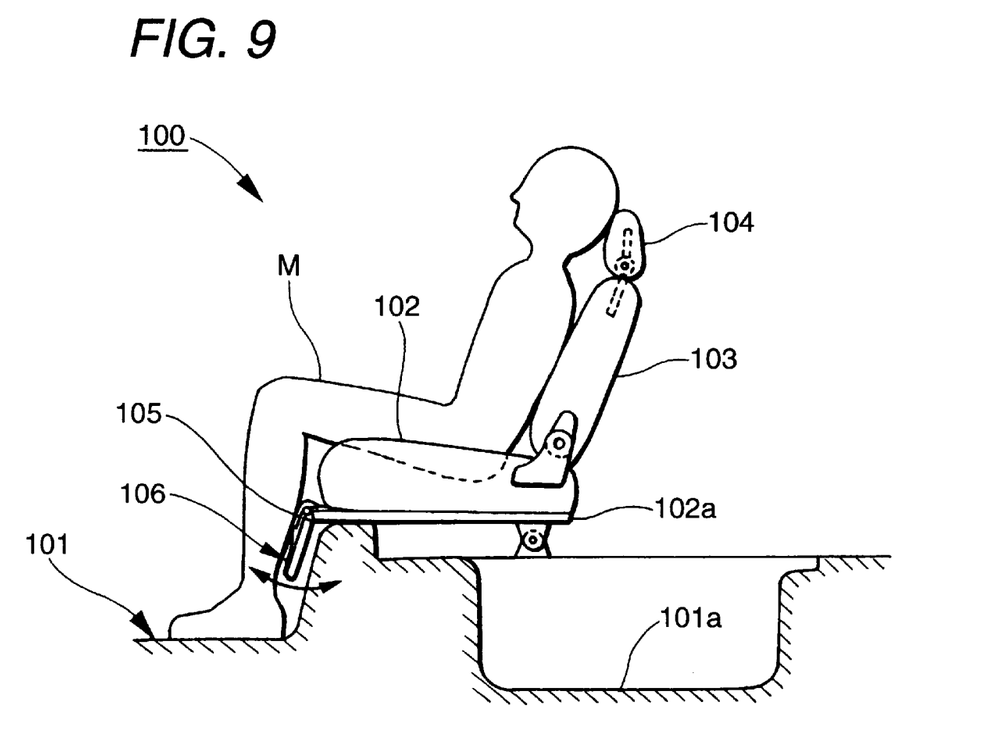
FIG. 9 is a diagram explaining a second operation of the conventional automotive seat.

FIG. 9 is a diagram explaining a second operation of the conventional automotive seat. The figure shows a state in which the automotive seat 100 is in use, and more specifically a state in which a passenger M is seated in the automotive seat 100.

The automotive seat 100 includes the seat cushion 102 mounted on the floor 101 of the vehicle, the seat back 103 mounted on the seat cushion 102, the head restraint 104 mounted on the seat back 103 and the lid body 106 mounted on the seat cushion via the hinge 105. Consequently, when the automotive seat 100 is in use, the lid body 106 is located at lower parts of the lower legs of the passenger M. If the lid body 106 flutters, for example, the lid body 106 is brought into contact with the legs of the passenger M, and this may cause a risk that the passenger M feels uncomfortable when this occurs.

Figure 10:
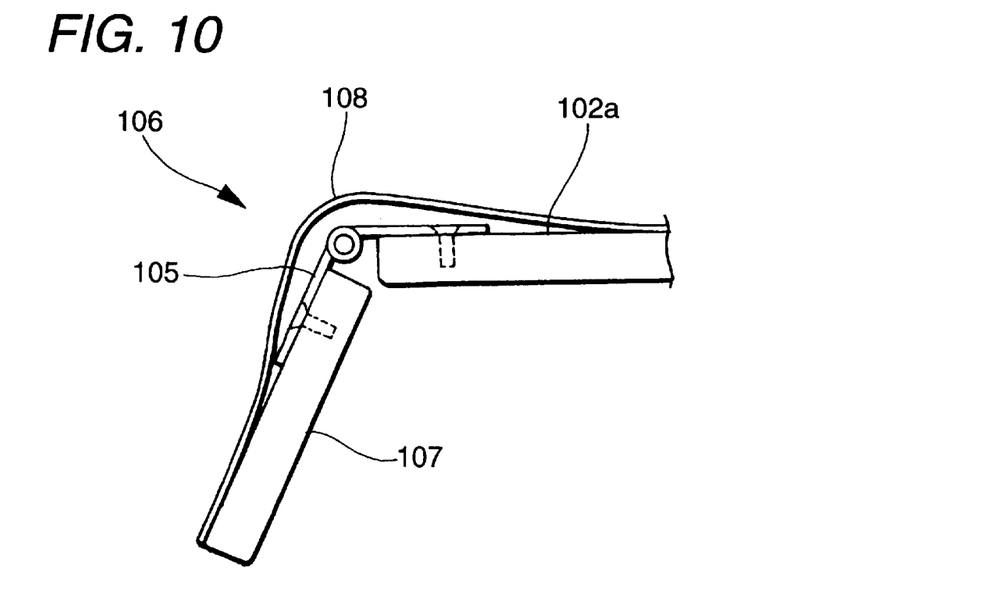
FIG. 10 is a side view of a lid body of the conventional automotive seat.

FIG. 10 is a side view of the lid body of the conventional automotive seat, showing one example of the construction of the lid body 106.

The lid body 106 comprises a lid main body 107 foldably mounted on the lower end of the front portion of a base portion 102a of the seat cushion 102 (refer to FIG. 9) via the hinge 105 and a cover 108 for covering the lid main body 107 and the hinge 105. Since a plate-like member is used for the lid main body 107, the weight of the lid body 106 is increased, which results in deterioration in operability when the automotive seat 102 is folded for accommodation.

SUMMARY OF THE INVENTION

To this end, an object of the invention is to provide an automotive seat which can prevent the fluttering of a lid body when the seat is in use and facilitate the folding operation of the seat by preventing the increase in weight of the lid body.

With a view to attaining the above object, according to a first aspect of the invention, there is provided an automotive seat constructed such that a seat back is caused to fall down toward a seat cushion side, that the seat back and the seat cushion are caused to rotate toward the rear of an automotive vehicle about a support portion provided at the rear of a lower portion of the seat cushion, that the seat back and seat cushion are accommodated in a depressed portion provided in a floor of the vehicle, and a space left in the depressed portion is closed with a lid body provided at the front of the lower portion of the seat cushion. The lid body includes a first carpet extending from the front of a lower portion of the seat cushion and a second carpet integrally attached to the first carpet via a base material such that the first carpet forms a hinge.

The lid body is constituted by the first carpet extending from the front of the lower portion of the seat cushion and the second carpet integrally attached to the first carpet via a base material, whereby the weight of the lid is reduced.

The first carpet is made to function as a hinge, so that the mounting construction of the lid body is made simple, whereby the construction of the automotive seat is made simple.

According to a second aspect of the invention, there is provided an automotive seat as set forth in the first aspect of the invention, wherein the lid body is constructed to be retained on the floor with a surface fastener.

When the automotive seat is in use, the lid body is constructed so as to be retained to the floor with the surface fastener to thereby prevent the lid body from fluttering.

DETAILED DESCRIPTION OF THE PREFERRED EMBODIMENTS

Embodiments of the invention will be described below with reference to the accompanying drawings. Note that "front," "rear," "left," "right," "up" "low" denote, respectively, a direction when viewed from the driver, and that Fr denotes the front side; Rr: the rear side; L: the left side; and R: the right side of the vehicle. Additionally, the drawings are to be viewed in a direction in which reference numerals are oriented.

Figure 1:
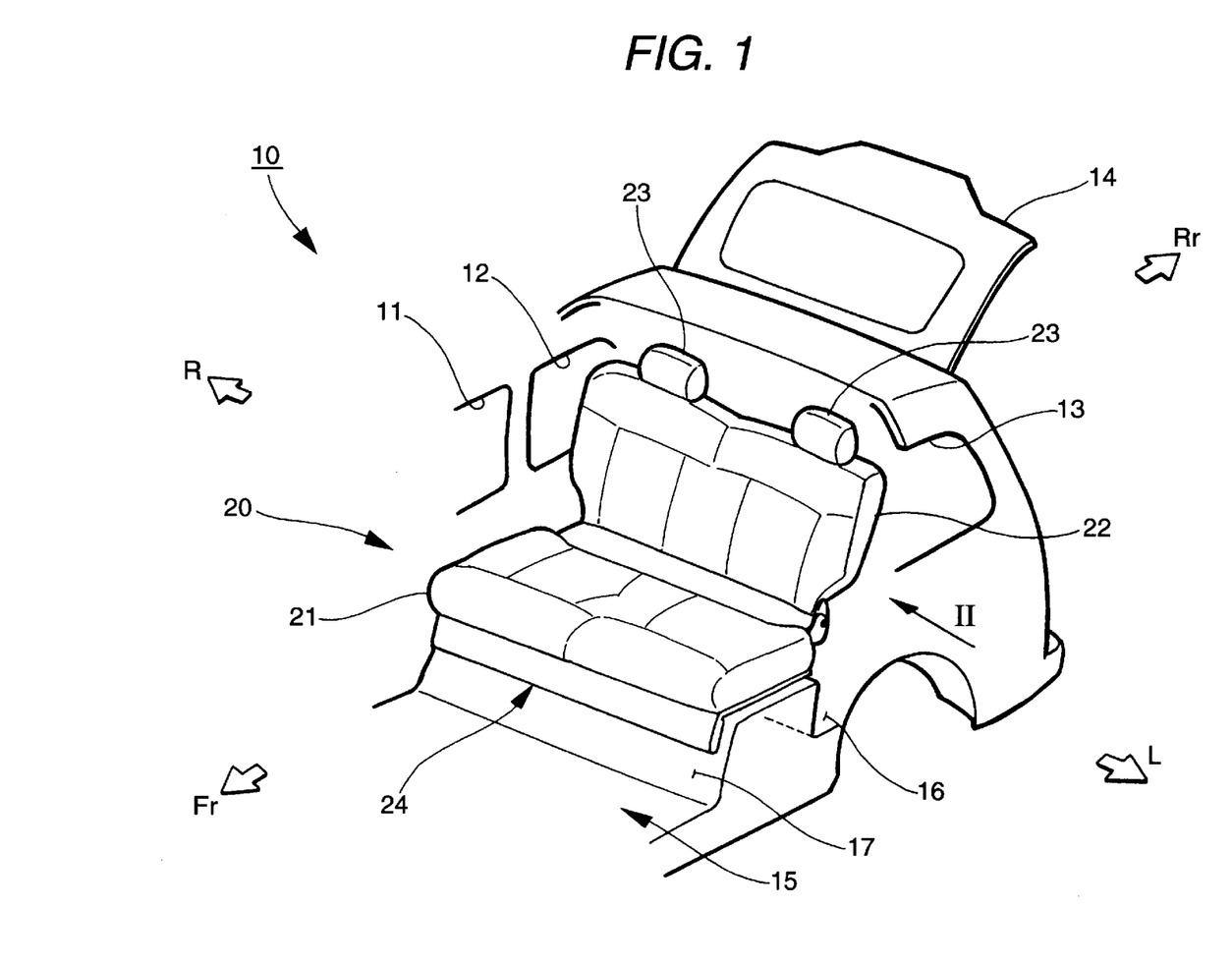
FIG. 1 is a perspective view of a rear part of an automotive vehicle where an automotive seat according to the invention is mounted.

FIG. 1 is a perspective view of a rear part of an automotive vehicle where an automotive seat according to the invention is mounted, in which reference numeral 10 denotes an automotive vehicle, reference numerals 11 a right front window glass, 12 a right rear window glass, 13 a left rear window glass, 14 a tail gate, 15 a floor of the vehicle 10, 16 a depressed portion provided in the floor 15 and 17 a wall surface of the floor 15.

An automotive seat 20 is a rear seat mounted in such a manner as to be accommodated in the depressed portion 16 in the floor 15, and the details thereof will be described with reference to FIGS. 2 and 3.

Figure 2:
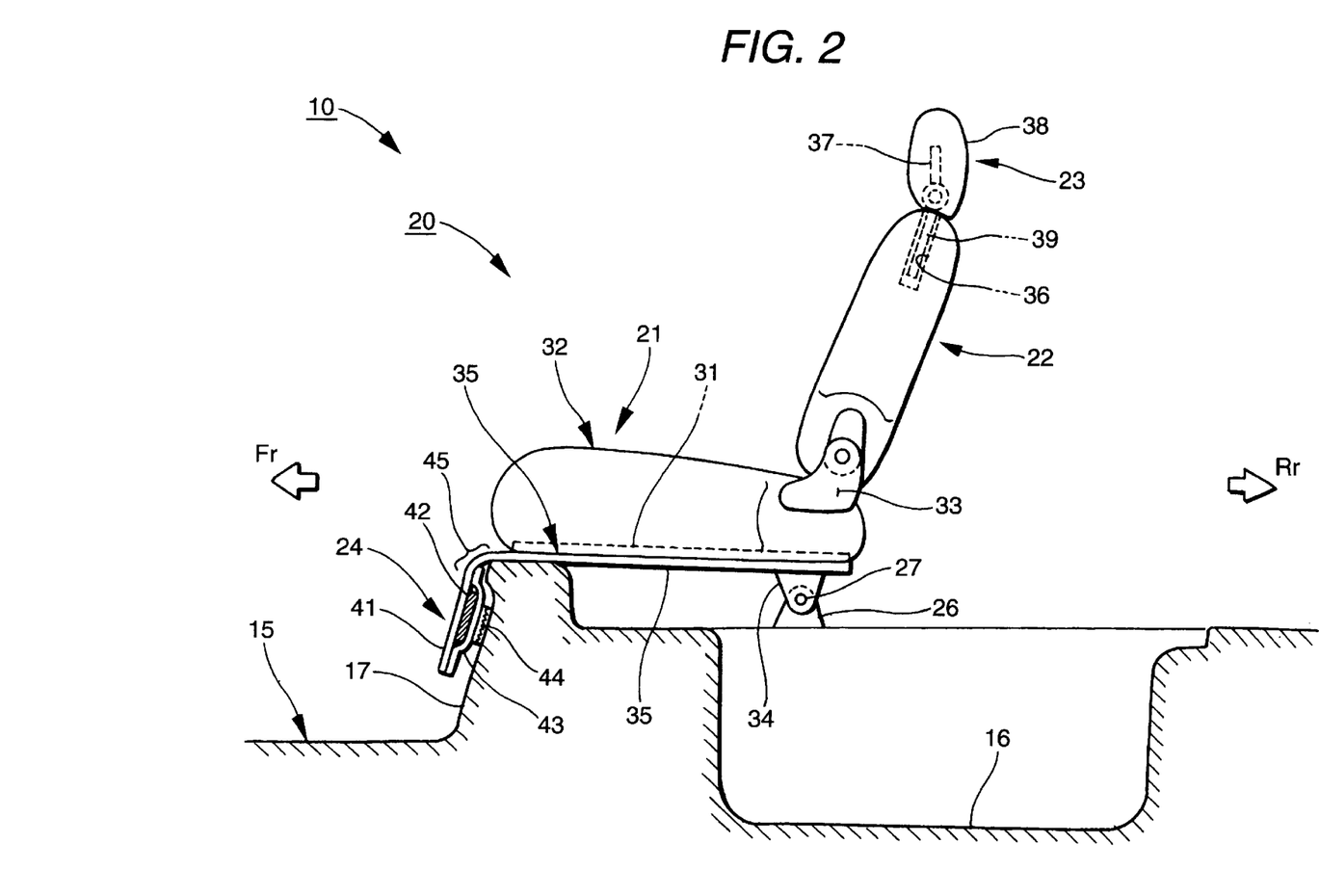
FIG. 2 is a view as viewed in a direction indicated by an arrow II in FIG. 1.

FIG. 2 is a view viewed in a direction indicated by an arrow II, which is a side view of the automotive seat 20.

The automotive seat 20 includes a seat cushion 21 rotatably mounted on the floor 15 of the vehicle 10 at a lower end of a rear portion thereof, a seat back 22 rotatably mounted on the seat cushion 21, a head restraint 23 mounted on an upper end of the seat back 22 slidably and rotatably and a lid 24, which is a lid body, provided at a lower end of a front portion of the seat cushion 21. Reference numeral 26 is a support portion provided on the floor for the automotive seat 20 and reference numeral 27 denotes a pivot interposed between the support portion 26 for the automotive seat 20 and the seat cushion 21.

The seat cushion 21 is constructed such that a cushion main body 32 is mounted on an upper surface of a base portion 31, that a reclining adjuster 33 is mounted for rotatably supporting the seat back 22 on the seat cushion 32, that a stay 34 is mounted on a bottom surface of a rear portion of the base portion 31, and that the bottom surface of the base portion 31 is covered with a first carpet 35 in such a manner that the stay 34 is left uncovered.

The seat back 22 is provided with a slide hole 36 for supporting the head restraint 23 slidably.

The head restraint 23 is constructed such that a head restraint main body 38 is mounted on a support frame 37 and that a rotatable arm 39 is mounted on the support frame 37, and the arm 39 is inserted into the slide hole 36 in the seat back 22.

In other words, the automotive seat 20 is constructed such that the seat back 22 is caused to fall down toward the seat cushion 21 side, that the seat back 22 and the seat cushion 21 are caused to rotate toward the rear of the vehicle about the support portion 26 provided at the rear of the lower portion of the seat cushion 21, that the seat back 22 and seat cushion 21 are accommodated in the depressed portion 16 provided in the floor 15 of the vehicle 10, and a space left in the depressed portion 16 is closed with the lid 24 provided at the front of the lower portion of the seat cushion 21.

Figure 3:
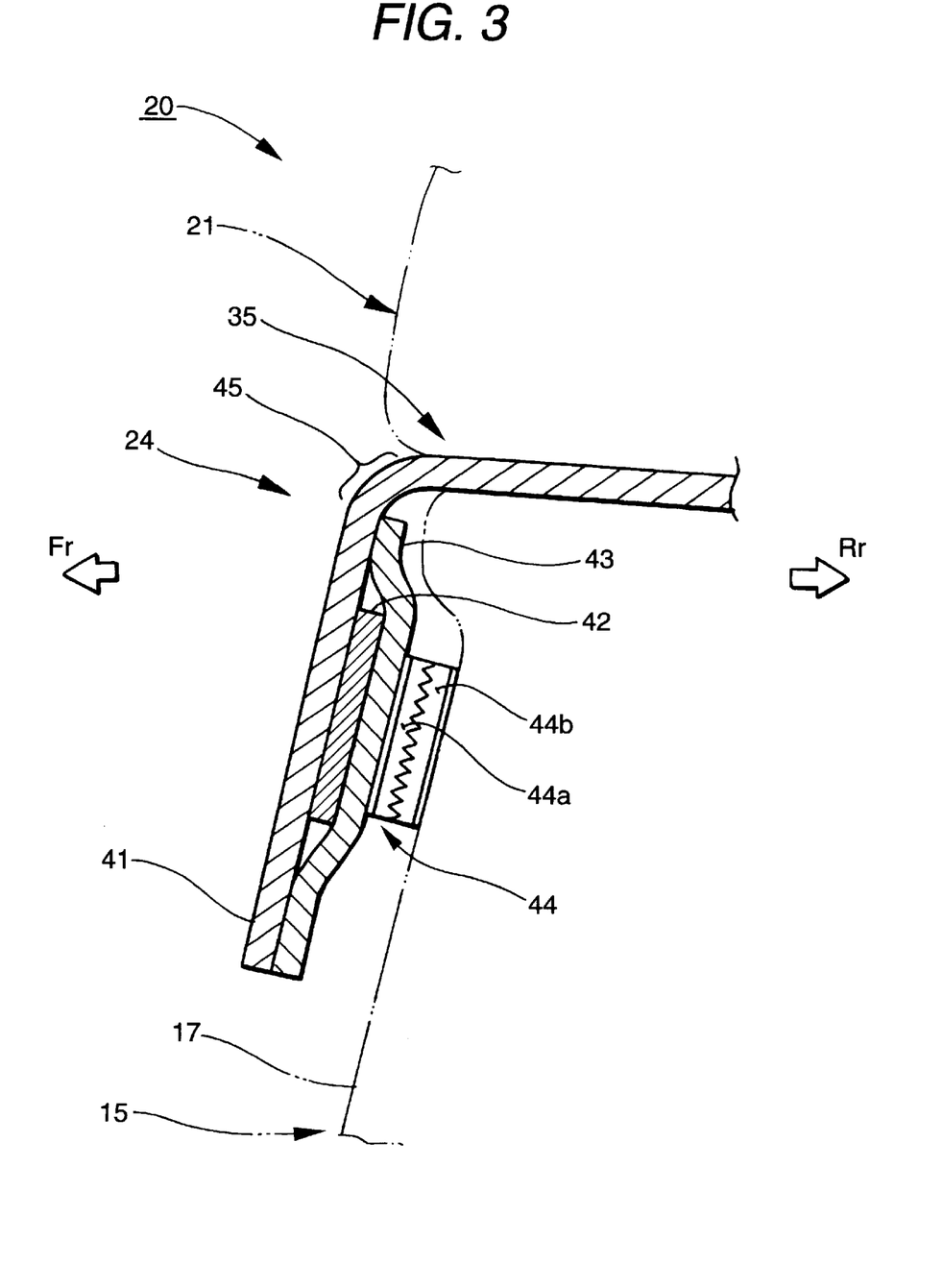
FIG. 3 is a sectional view of a lid of the automotive seat according to the invention.

FIG. 3 is a sectional view of the lid of the automotive seat according to the invention.

The lid 24 includes an extending portion 41 of the first carpet 35 extending from the front of the lower portion of the seat cushion 21, a second carpet 43 integrally mounted on the extending portion 41 via a base material 42 and a surface fastener 44 interposed between the second carpet 43 and the wall surface 17 of the floor 15. In addition, reference numerals 44a denotes a fastener on one side which is mounted on the lid 24; 44b: a fastener on the other side which is mounted on the wall surface 17; and 45: a hinge the function of which is performed by the first carpet 35.

Namely, since the lid 24 is constituted by the extending portion 41 of the first carpet 35 extending from the front of the lower portion of the seat cushion 21 and the second carpet 43 integrally mounted on the extending portion 41 via the base material 42, the weight of the lid 24 can be reduced. In addition, since the first carpet 35 is made to function as the hinge 45 and the mounting construction of the lid 24 is made simple, the construction of the automotive seat 20 can also be made simple. Furthermore, since the lid 24 is constructed so as to be retained to the floor 15 by the surface fastener 44 when the automotive seat 20 is in use, the fluttering of the lid 24 can be prevented.

Next, an operation of the automotive seat 20 described above will be described below.

Figure 4A:
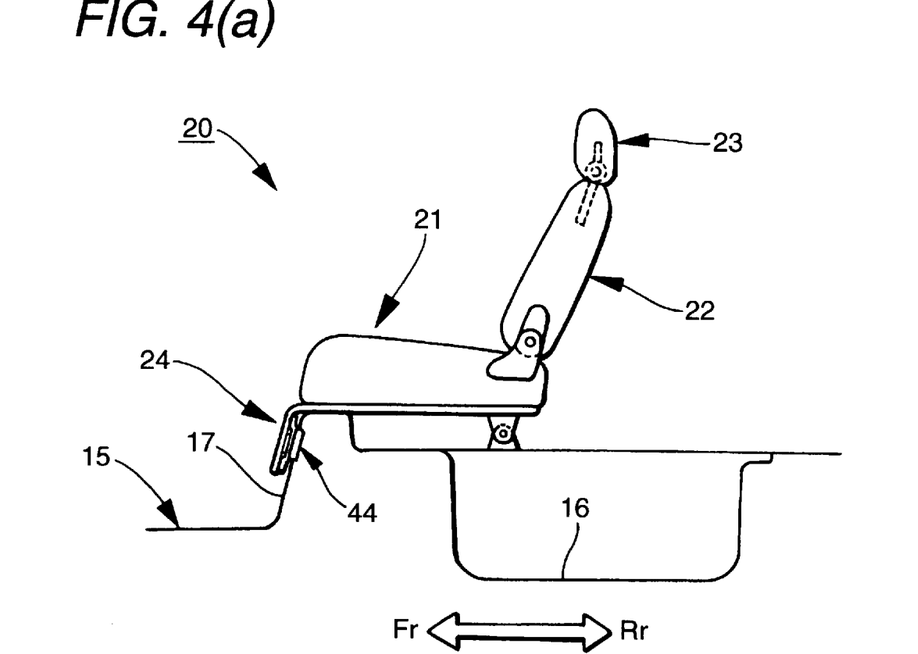
FIGS. 4A and 4B are diagrams explaining an operation of the automotive seat of the invention (a former half of the operation).
Figure 4B:
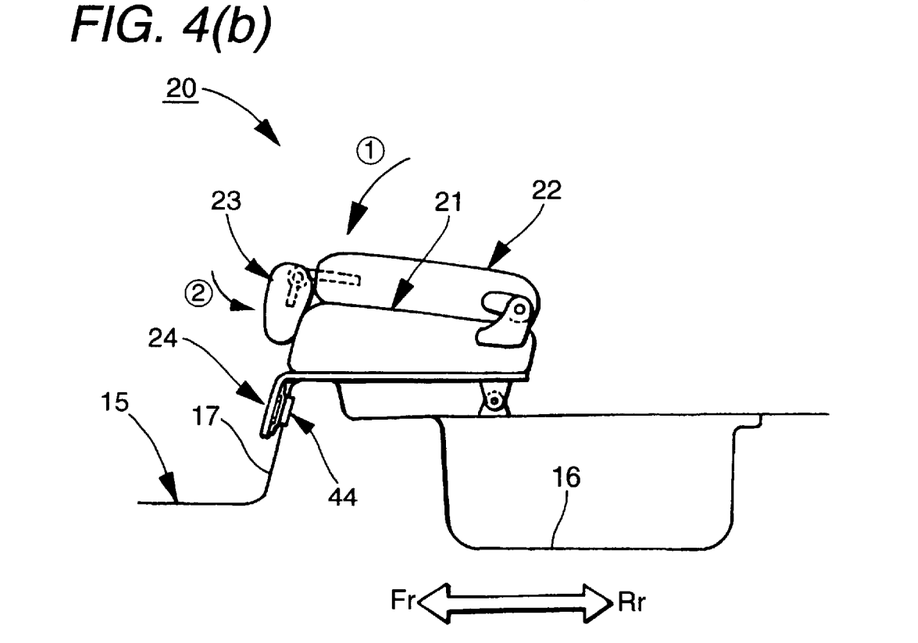

FIGS. 4A and 4B are views explaining an operation (a former half thereof) of the automotive seat according to the invention and show a procedure of changing the state of the automotive seat 20 from a state in which the seat is in use to a state in which the seat is accommodated.

In FIG. 4A, when the automotive seat 20 is in use (in a state in which the seat is used), the lid 24 is retained to the wall surface 17 of the floor 15 by the surface fastener 44 to thereby prevent the fluttering of the lid 24.

In FIG. 4B, the seat back 22 is folded over the seat cushion 21 as indicated by an arrow ①, and the head restraint 23 is caused to rotate toward the seat cushion 21 side as indicated by an arrow ② in such a manner that the head restraint 23 is folded on the seat cushion 21.

Figure 5A:
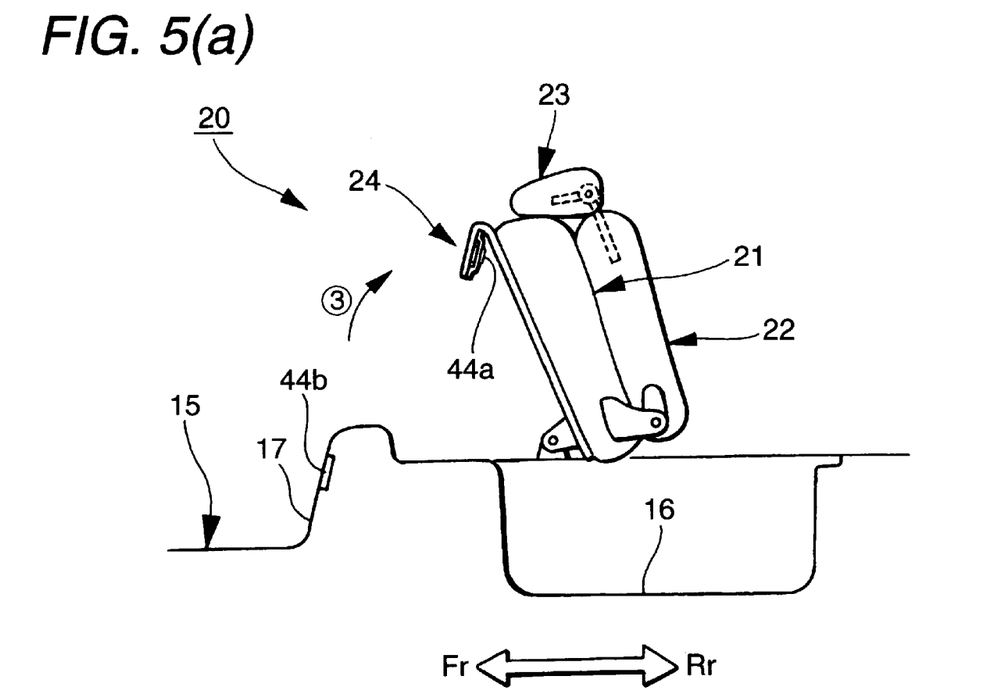
FIGS. 5A and 5B are diagrams explaining an operation of the automotive seat of the invention (a latter half of the operation)
Figure 5B:
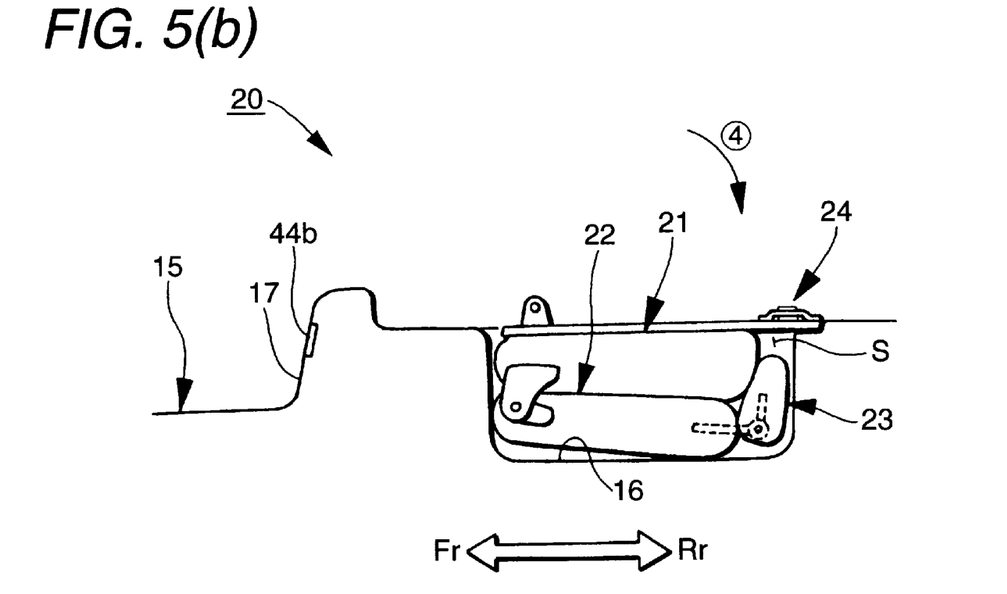

FIGS. 5A and 5B are views explaining an operation (a later half thereof) of the automotive seat according to the invention and show a procedure of changing the state of the automotive seat 20 from a state in which the seat is in use to a state in which the seat is accommodated.

In FIG. 5A, an integral unit of the seat cushion 21, the seat back 22 and the head restraint 23 resulting when the seat back 22 and the head restraint 23 are folded over the seat cushion 21 as described above is caused to rotate toward the rear of the vehicle as indicated by an arrow ③.

In FIG. 5B, the integral unit of the seat cushion 21, the seat back 22 and the head restraint 23 is accommodated in the depressed portion 16 provided in the floor 15 of the vehicle 10 (refer to FIG. 1) as indicated by an arrow ④, and a space S left in the depressed portion 16 is then closed with the lid 24, whereby the automotive seat 20 is put in the accommodated state.

Figure 6:
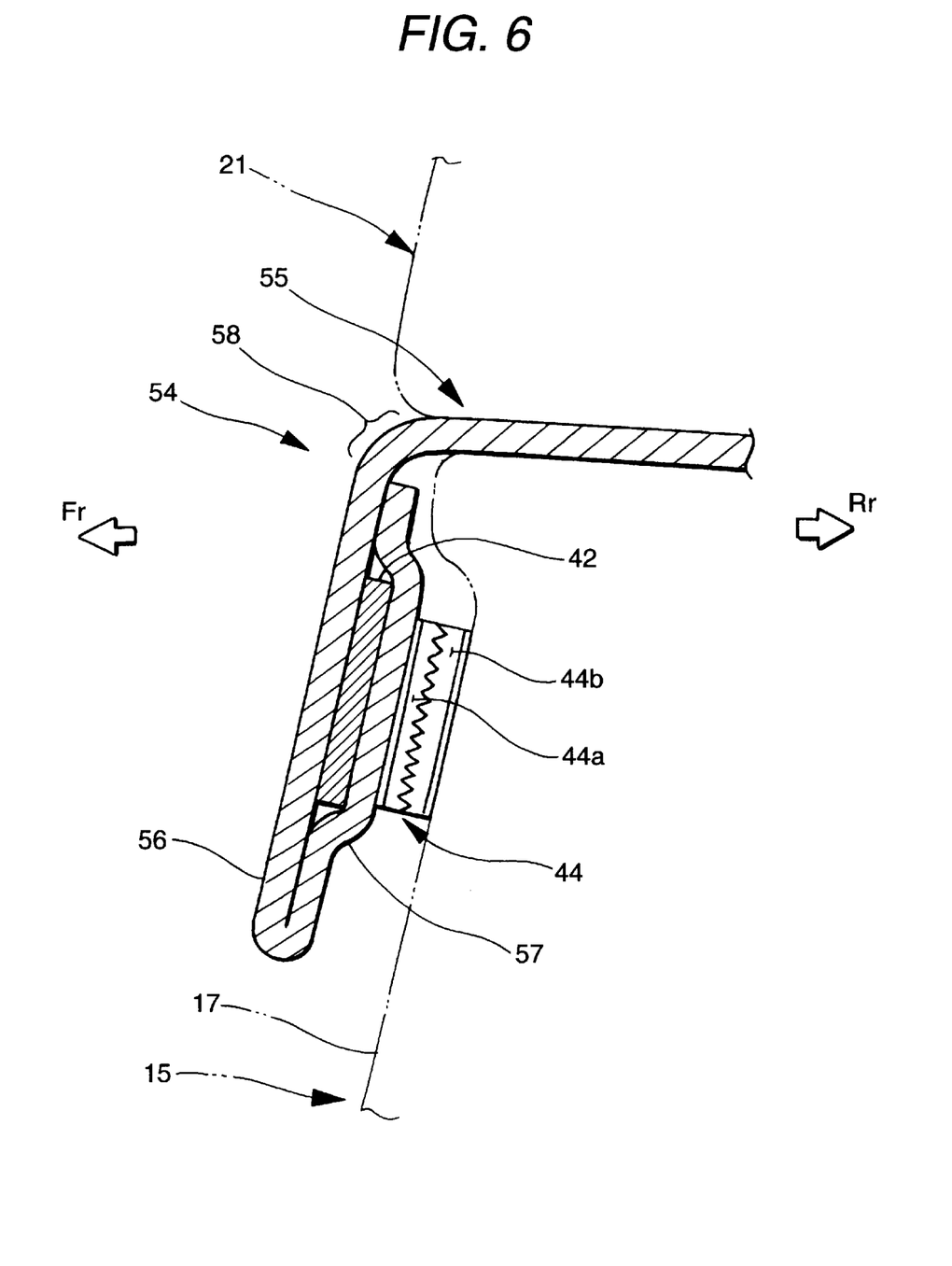
FIG. 6 is a sectional view of a lid according to another embodiment of an automotive seat of the invention.

FIG. 6 is a sectional view of a lid according to another embodiment of an automotive seat of the invention and shows a lid 54, which serves as the lid body. Note that like reference numerals are given to like components to those of FIG. 3 and the description thereof will be omitted.

In the figure, reference numeral 21 denotes a seat cushion, 44a surface fastener, 44a a fastener on one side and 44b, a fastener on the other side. The lid 54 includes an extending portion 56 of a first carpet 55 extending from the front of a lower portion of the seat cushion 21, a folded portion 57 formed as a second carpet by folding back the extending portion 56 and a base material 42 interposed between the folded portion 57 and the extending portion 56. Namely, since the folded portion 57 is put on the extending portion 56 via the base material 42, the automotive seat 20 (refer to FIG. 2) can be made simpler. Note that reference numeral 58 denotes a hinge as which the first carpet 55 is made to function.

Figure 7:
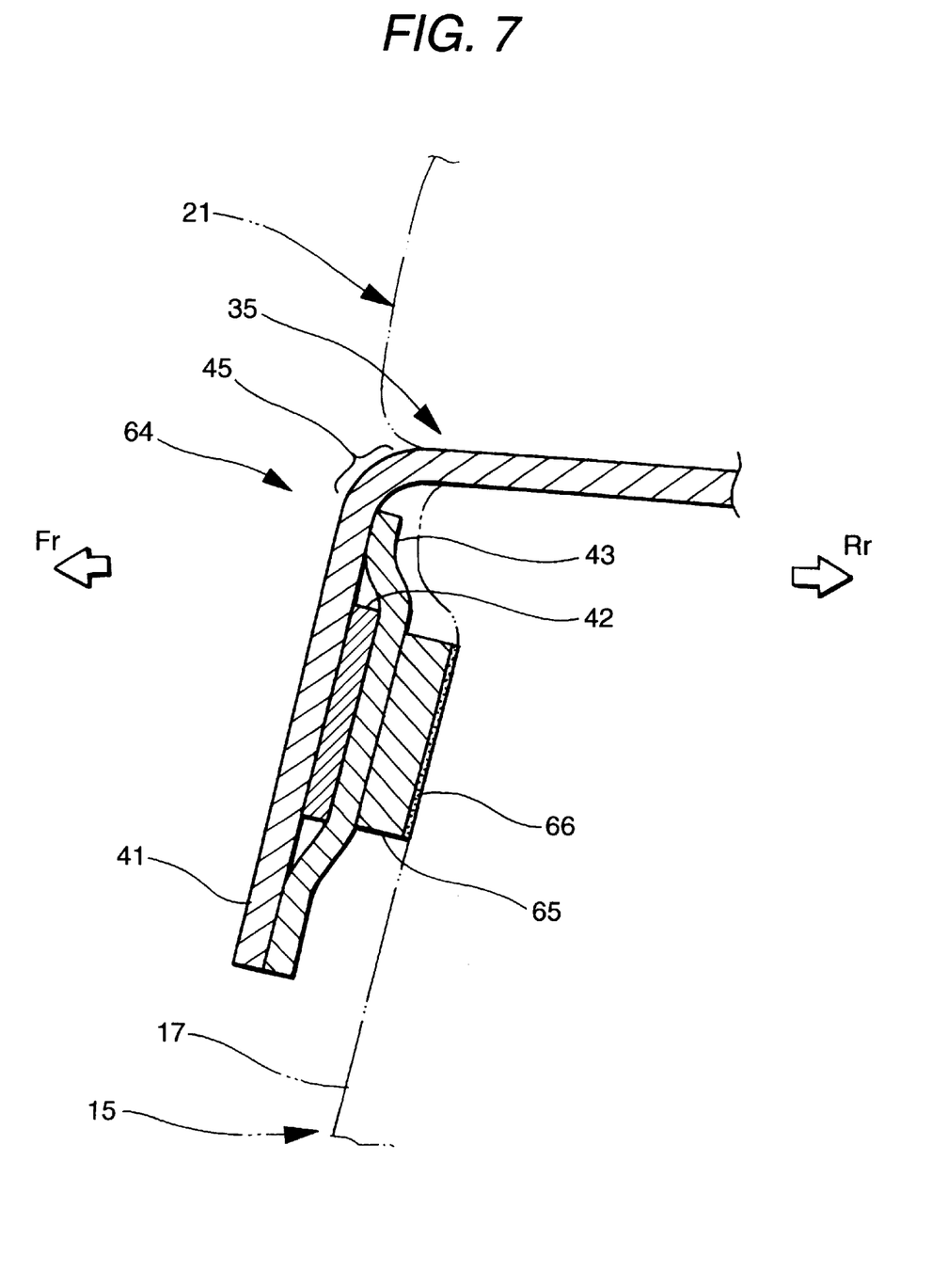
FIG. 7 is a sectional view of a lid according to a still another embodiment of an automotive seat of the invention.

FIG. 7 is a sectional view of a lid according to a still another embodiment of an automotive seat of the invention and shows a lid 64, which serves as the lid body. Note that like reference numerals are given to like components to those of the lid 24 (refer to FIG. 3) and the description thereof will be omitted.

In the figure, reference numeral 21 denotes a seat cushion; 35: a first carpet; 42: a base material; 43: a second carpet; and 45: a hinge. In other words, the lid 64 is constructed such that a magnet 65 is mounted on the second carpet 43, while an iron plate 66 is mounted on a wall surface 17, so that the lid 64 is retained to a floor side 15 with the magnet 65.

In addition, as shown in FIG. 1, while the automotive seat has been described as being used as the rear seat, the invention is not limited to the usage, but the automotive seat 20 may be used as an automotive seat to be interposed at an intermediate position between the front seat and the rear seat.

While only certain embodiments of the invention have been specifically described herein, it will apparent that numerous modifications may be made thereto without departing from the spirit and scope of the invention.

Being constructed as described heretofore, the invention exhibits the following advantages.

According to the first aspect of the invention, since the lid body is constituted by the first carpet extending forward from the lower portion of the seat back and the second carpet integrally mounted on the first carpet via the base material, the weight of the lid body can be reduced. In addition, since the first carpet is made to function as the hinge, the construction of the automotive seat can be made simple.

As a result, it is possible to realize the automotive seat which can prevent the increase in weight of the lid to thereby facilitate the folding operation of the seat.

According to the second aspect of the invention, since the lid is constructed so as to be retained with the surface fastener to the floor while the automotive seat is in use, the fluttering of the lid can be prevented. As a result, it is possible to improve the comfort when seated in the automotive seat.

What is claimed is:

1. An automotive seat comprising:

a seat cushion;

a seat back foldable with respect to said seat cushion;

a support portion disposed on a rear of a lower portion of said seat cushion, whereby said folded seat back and said seat cushion being rotated toward the rear of a vehicle about said support portion such as to be accommodated in a depressed portion provided in a floor of said vehicle; and a lid body provided in a front of the lower portion of said seat cushion such as to close a space left in said depressed portion, said lid body comprising:

a first carpet extending from the front of the lower portion of said seat cushion; and a second carpet integrally attached to said first carpet such that said first carpet forms a hinge.

2. The automotive seat according to claim 1, further comprising:

a surface fastener retaining said lid body on said floor when said automotive seat is in use.

3. The automotive seat according to claim 2, wherein said surface fastener includes a first fastener disposed on one of said lid body and said floor, and a second faster disposed on the other of said lid body and said floor.

4. The automotive seat according to claim 3, wherein said first fastener is made of magnetic material.

5. The automotive seat according to claim 1, wherein said second carpet is formed by folding an end of said first carpet.

6. The automotive seat according to claim 1, wherein said first carpet covers the lower portion of said seat cushion.

7. The automotive seat according to claim 1, wherein said second carpet is disposed between said first carpet and said floor when said automotive seat is in use.

8. The automotive seat according to claim 1, wherein a base material is interposed between said first carpet and said second carpet.

* * * * *